(12) United States Patent
Allen

(10) Patent No.: US 11,297,982 B2
(45) Date of Patent: Apr. 12, 2022

(54) CAKE CARRIER

(71) Applicant: Margaret Allen, Philadelphia, PA (US)

(72) Inventor: Margaret Allen, Philadelphia, PA (US)

(*) Notice: Subject to any disclaimer, the term of this patent is extended or adjusted under 35 U.S.C. 154(b) by 386 days.

(21) Appl. No.: 16/420,476

(22) Filed: May 23, 2019

(65) Prior Publication Data
US 2019/0365158 A1 Dec. 5, 2019

Related U.S. Application Data

(60) Provisional application No. 62/681,077, filed on Jun. 5, 2018.

(51) Int. Cl.
| | | |
|---|---|---|
| *B62B 3/10* | (2006.01) | |
| *B62B 3/02* | (2006.01) | |
| *A47J 47/14* | (2006.01) | |
| *A47G 19/00* | (2006.01) | |
| *B62B 5/00* | (2006.01) | |

(52) U.S. Cl.
CPC ............. *A47J 47/14* (2013.01); *A47G 19/00* (2013.01); *B62B 3/02* (2013.01); *B62B 3/10* (2013.01); *B62B 5/00* (2013.01); *B62B 5/0013* (2013.01)

(58) Field of Classification Search
None
See application file for complete search history.

(56) References Cited

U.S. PATENT DOCUMENTS

| | | | | |
|---|---|---|---|---|
| 577,471 | A * | 2/1897 | Ward | B62B 3/00 414/498 |
| 1,599,227 | A * | 9/1926 | Gantvoort | A21B 3/07 414/331.01 |
| 3,261,650 | A * | 7/1966 | Stromqvist | A47J 39/003 312/236 |
| 3,339,524 | A * | 9/1967 | Benz | A21C 15/005 118/24 |
| 3,829,063 | A * | 8/1974 | Holzworth | B66F 3/24 254/2 R |
| 3,869,052 | A * | 3/1975 | Leahy | B62B 5/0495 414/401 |
| 3,957,327 | A * | 5/1976 | Parrish | A47G 19/26 312/284 |
| 4,132,457 | A * | 1/1979 | Parrish | A47G 19/26 220/4.24 |
| 5,224,812 | A * | 7/1993 | Oslin | A21B 3/07 414/401 |
| 5,875,904 | A * | 3/1999 | Vorstenbosch | B62B 3/003 211/180 |
| 6,431,319 | B1 * | 8/2002 | Myers | B62B 3/02 187/243 |
| 6,615,973 | B2 * | 9/2003 | Fritter | B62B 3/04 198/498 |
| 8,540,273 | B2 * | 9/2013 | Dobrachinski | B62B 5/0003 280/651 |
| 9,738,447 | B1 * | 8/2017 | Schaftenaar | B65D 85/68 |
| 10,076,838 | B1 * | 9/2018 | Martinez | H01B 13/012 |
| 10,149,563 | B2 * | 12/2018 | Chapin | A47G 19/26 |
| 10,160,469 | B2 * | 12/2018 | Grou | B62B 3/02 |

(Continued)

*Primary Examiner* — Katy M Ebner
(74) *Attorney, Agent, or Firm* — Paul & Paul

(57) ABSTRACT

A device structured and arranged a more reliable means of transporting tall wedding cakes, tiered cakes, large floral arrangements or ice sculptures from their place of creation to their destination includes a height-adjustable platform, a sliding tray, and poles for supporting the platform.

8 Claims, 3 Drawing Sheets

(56) References Cited

U.S. PATENT DOCUMENTS

| | | | | |
|---|---|---|---|---|
| 10,407,087 B1* | 9/2019 | Baker | ................... | B62B 3/0612 |
| 10,717,454 B1* | 7/2020 | Alvarez | ................... | B62B 3/004 |
| 2004/0108689 A1* | 6/2004 | Nguyen | ................... | B62B 3/02 |
| | | | | 280/651 |
| 2010/0320732 A1* | 12/2010 | Dobrachinski | ........... | B62B 3/02 |
| | | | | 280/651 |
| 2011/0226659 A1* | 9/2011 | Chapin | ................. | A47G 19/26 |
| | | | | 206/525 |
| 2011/0243696 A1* | 10/2011 | DiBenedetto | ............. | B66F 9/06 |
| | | | | 414/490 |
| 2012/0145978 A1* | 6/2012 | Rich | ..................... | B62B 3/0606 |
| | | | | 254/2 R |
| 2014/0169922 A1* | 6/2014 | Cozza | ................... | B66F 7/0608 |
| | | | | 414/495 |
| 2014/0190077 A1* | 7/2014 | Burmann | .................. | B62B 3/02 |
| | | | | 47/66.1 |
| 2015/0014264 A1* | 1/2015 | Linnell, Sr. | ............. | B65D 19/42 |
| | | | | 211/187 |
| 2015/0314026 A1* | 11/2015 | Mauzerall | ............... | A61B 50/00 |
| | | | | 312/209 |
| 2016/0244079 A1* | 8/2016 | Grappe | ..................... | B62B 3/02 |
| 2018/0111635 A1* | 4/2018 | Oltman | .................... | B25H 1/08 |
| 2019/0344699 A1* | 11/2019 | Radetzki | ............... | B60R 25/252 |
| 2019/0365158 A1* | 12/2019 | Allen | ........................ | B62B 3/04 |
| 2020/0015431 A1* | 1/2020 | Kirk | ........................ | A01G 9/12 |
| 2021/0070339 A1* | 3/2021 | Delgatty | ................. | B60R 25/24 |

\* cited by examiner

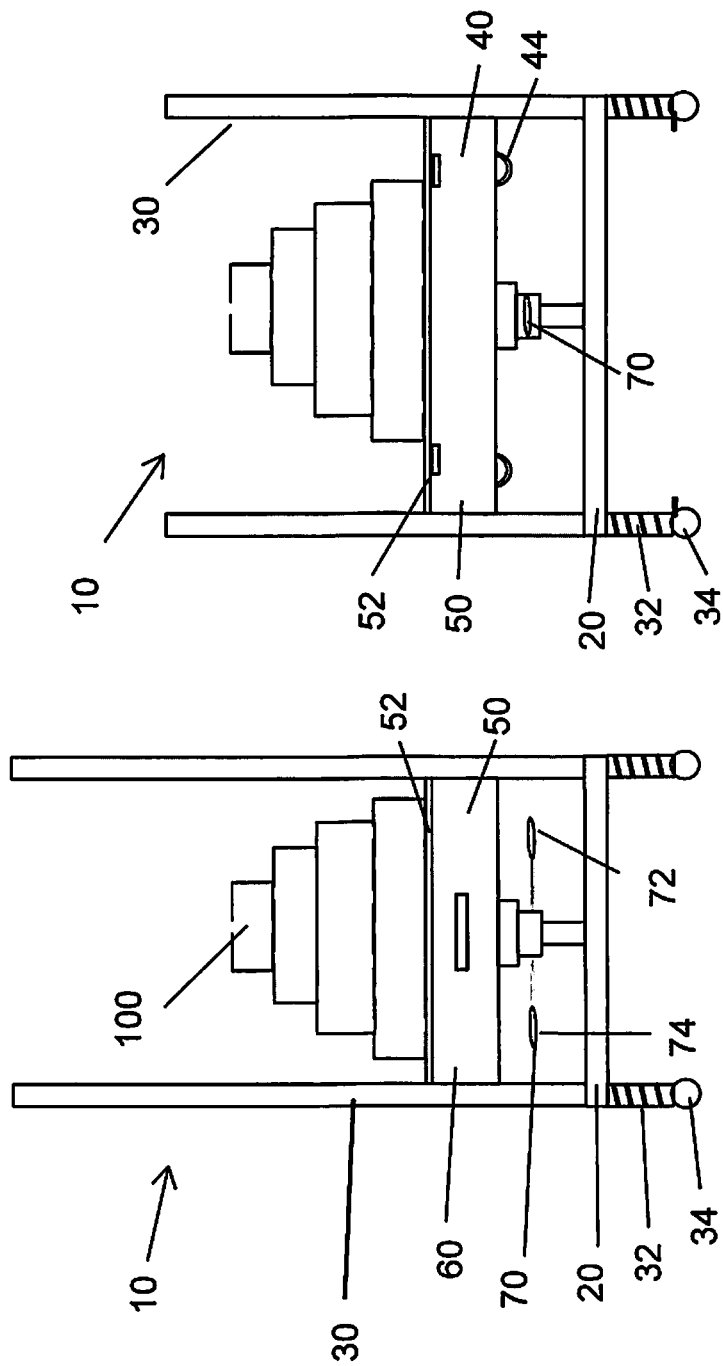

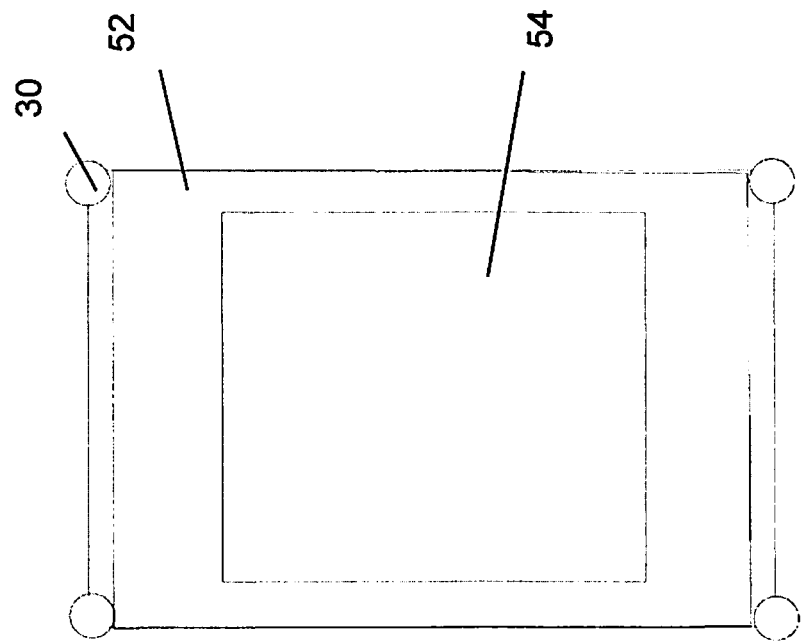
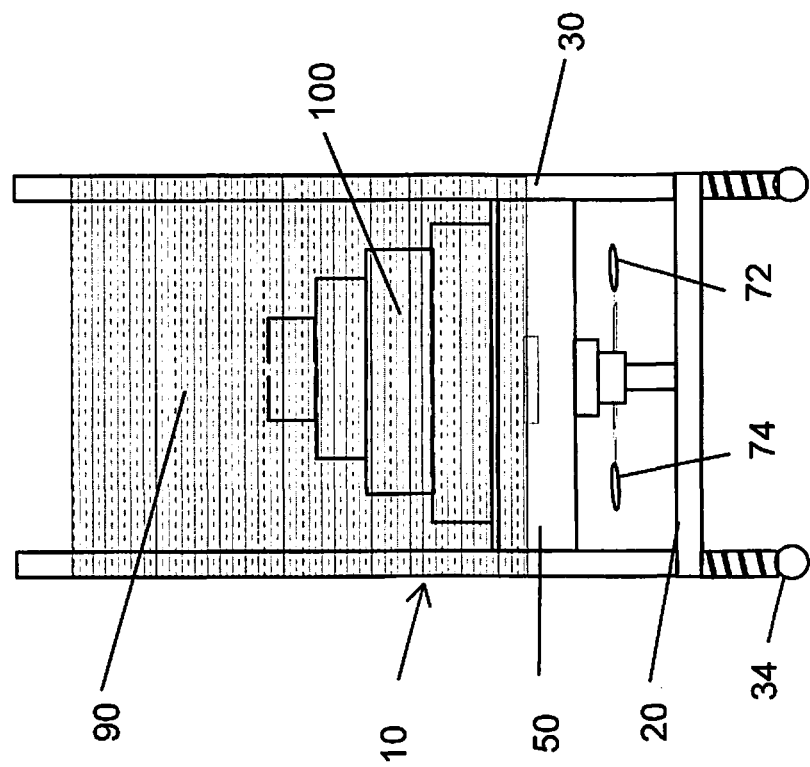

CAKE CARRIER

CROSS-REFERENCE TO RELATED APPLICATION

This application claims the priority of U.S. Provisional Patent Application 62/681,077, filed Jun. 5, 2018, which is incorporated by reference in its entirety herein.

BACKGROUND OF THE INVENTION

1. Field of the Invention

The present invention relates generally to the field of carrier devices and more specifically relates to a device structured and arranged a more reliable means of transporting tall wedding cakes, tiered cakes, large floral arrangements or ice sculptures from their place of creation to their destination.

2. Brief Description of the Prior Art

A wedding cake is the traditional cake served at wedding receptions following dinner. In some parts of England, the wedding cake is served at a wedding breakfast; the "wedding breakfast" does not mean the meal will be held in the morning, but at a time following the ceremony on the same day. In modern Western culture, the cake is usually on display and served to guests at the reception. Traditionally, wedding cakes were made to bring good luck to all guests and the couple. Modernly however, they are more of a centerpiece to the wedding and are not always even served to the guests. Some cakes are built with only a single edible tier for the bride and groom to share, but this is rare since the cost difference between fake and real tiers is minimal. Unfortunately, transporting a tiered cake or other tall structure is a challenge.

Various attempts have been made to solve the problems which may be found in the related art but have thus far been unsuccessful. Thus, a need exists for a reliable cake carrier, a device structured and arranged a more reliable means of transporting tall wedding cakes, tiered cakes, large floral arrangements or ice sculptures from their place of creation to their destination and to avoid the above-mentioned problems.

SUMMARY OF THE INVENTION

In view of the foregoing disadvantages inherent in the known carrier device art, the present invention provides a novel cake carrier. The general purpose of the present invention, which will be described subsequently in greater detail, is to provide a device structured and arranged a more reliable means of transporting tall wedding cakes, tiered cakes, large floral arrangements or ice sculptures from their place of creation to their destination. The features of the invention which are believed to be novel are particularly pointed out and distinctly claimed in the concluding portion of the specification. These and other features, aspects, and advantages of the present invention will become better understood with reference to the following drawings and detailed description.

Thus, the present invention provides a cake carrier including a height adjustable platform for receiving a cake; a plurality of poles for supporting the height adjustable platform, means for adjusting the height of the platform, a tray covering the height adjustable platform, the tray being extendible from a first position covering the platform to a second position extending from the side of the platform, and a plurality of castors. Preferably, the height of the poles can be adjusted. Preferably, the cake carrier further includes sides extending from the platform, the sides being adjustable from a first position extending downward to a second position extending upward. Preferably, the cake carrier further includes an integral drawer for storage of utensils. Preferably, the means for adjusting the height of the adjustable platform includes a hydraulic lift. Preferably, the cake carrier further includes a cover extending between the poles to protect the cake being transported. Preferably, the cover is formed from a mesh material. Preferably, the cake carrier further includes a base extending between the poles and supporting the means for adjusting the height of the platform. Preferably, a castor is affixed to each pole. Preferably, the cake carrier further includes at least one extension pole mounted on top of a corresponding pole. Preferably, the cake carrier further includes shock absorbers for cushioning the effect of encountering irregular surfaces during transport of a cake. Preferably, the shock absorbers are mounted below the base on the poles.

BRIEF DESCRIPTION OF THE DRAWINGS

The figures which accompany the written portion of this specification illustrate embodiments and method(s) of use for the present invention, cake carrier, constructed and operative according to the teachings of the present invention.

FIG. 1 is a front elevational view of a cake carrier according to an embodiment of the present invention.

FIG. 2 is a side elevational view of the cake carrier of FIG. 1.

FIG. 5 is a front elevational view of the cake carrier of FIG. 1 showing the carrier covered with a protective mesh cover.

FIG. 6 is a top plan view of the cake carrier of FIG. 1.

Figure 4:
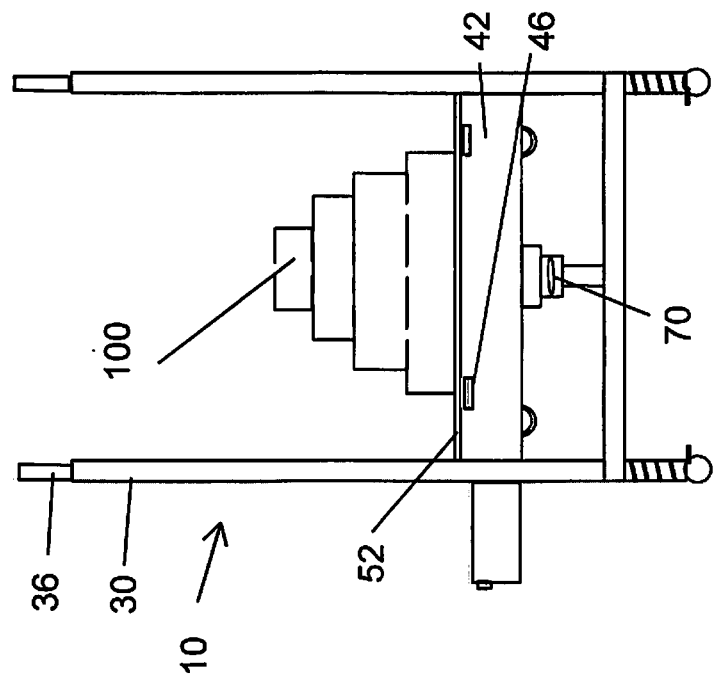
FIG. 4 is a side elevational view of the cake carrier of FIG. 1 showing the drawer in an extended position.

The various embodiments of the present invention will hereinafter be described in conjunction with the appended drawings.

DETAILED DESCRIPTION OF THE PREFERRED EMBODIMENTS

Embodiments of the present invention relate to a carrier device and more particularly to a cake carrier, a device structured and arranged a more reliable means of transporting tall wedding cakes, tiered cakes, large floral arrangements or ice sculptures from their place of creation to their destination.

The cake carrier comprises a novel product offering consumers a practical solution to the aforementioned challenges. The cake can be assembled and frosted on the cake carrier or transferred from another surface on which it was assembled and frosted. When a cake is to be transferred from another surface to the cake carrier, the cake carrier is positioned near the surface where the cake has been completed and is ready for transport, and the user would raise or lower the platform of the cake carrier to match the height of that surface, and then slide the sliding tray in the direction of the preparation surface. The cake is then transferred to the sliding tray allowing easy safe transport from table to the cake carrier. Often, the cake will have been assembled on a cardboard support, and the tray can be slid under the cardboard support, and the tray can then be slid back onto and over the platform. The sliding tray includes an integrated rubber mat to prevent sliding of the cake off the carrier during transport. The sides of the tray are hinged sides and can be positioned upwards and locked in place to further secure the cake. The platform can then be lowered to desired level depending on cake height to provide a lower center of gravity and thus provide additional stability during transport. Once the cake is secured an adjustable breathable element resistant mesh cover can then be applied for protection. Height-adjustable poles are provided at the corners of the cake carrier. The poles can be adjusted as needed to allow the cake carrier to be conveniently pushed inside a vehicle. The device will keep tall wedding cakes stabilized in the vehicle for safe transport to a wedding reception or another destination.

The cake carrier permits the baker or caterer to avoid having to repair icing damage upon arrival at destination. Lockable rotating castors are provided so that free movement of the device is permitted while shock absorbers dampen vibration while rolling on rough or uneven surfaces. Under the platform and sliding tray a drawer is provided for storage of tools needed by the baker/caterer. To raise/lower the platform levers are provided to operate a hydraulic lift and secured into place with lock tabs. The cake carrier is preferably constructed of stainless steel and can be made in a variety of sizes accommodating the need of various sized cakes.

The cake carrier offers bakers/caterers a reliable means of transporting large cakes. Use of the carrier can change a multiple person job into a single person operation.

The cake carrier may also be used for floral arrangements, ice sculptures or any larger delicate items that need to be transported from one destination to another.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

Figure 3:
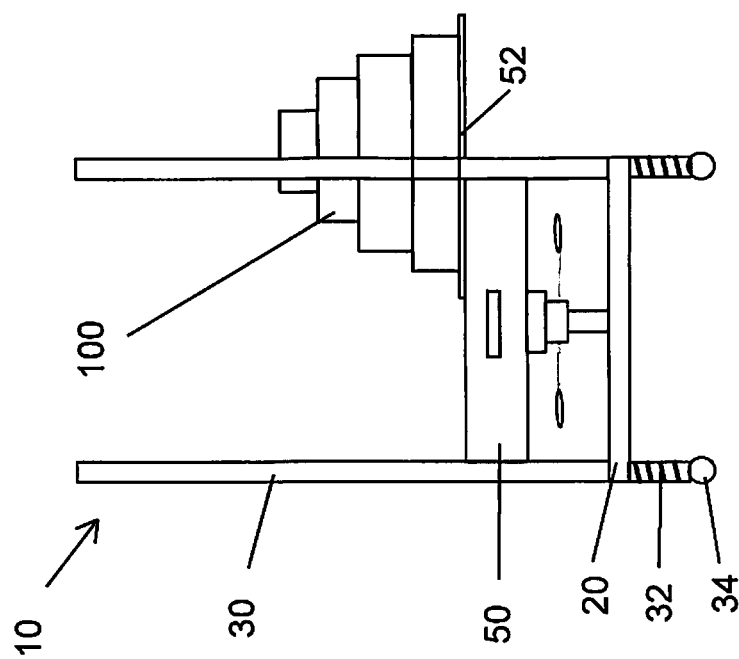
FIG. 3 is a side elevational view of the cake carrier of FIG. 1 showing the sliding tray in an extended position.

Referring now to the figures in which like reference numerals represent like elements in each of the several views, there is shown in FIG. 1 a front elevational view of a presently preferred embodiment of a cake carrier 10 according to the present invention. The cake carrier 10 includes a generally rectangular base 20 on which are mounted at the corners of the base 20 a plurality of poles of legs 30. Preferably, each pole 30 is formed from a plurality of telescoping tubes so that the height of each pole 30 can be varied as desired. Preferably, each pole 30 is provided with detents and corresponding apertures so that the poles can be locked in place at predetermined extensions, such as two feet, three feet, four feet, etc. (as shown in FIGS. 1 and 2). Mounted between the poles 30 for vertical travel thereon is a generally rectangular and box-like platform 50 for receiving a cake 100. The height of the platform 50 can be adjusted with a hydraulic lift 70, or other suitable mechanism such as a screw. The hydraulic lift 70 is provided with a raise lever 72 for raising the platform 50 and a lower lever 74 for lowering the platform 50. The platform 50 is covered with a slide 52 which is mounted on top of the platform 50 for a sliding motion over the platform 50 by conventional drawer slides or the like. The slide 52 is mounted for travel between a first position, in which the slide 52 is positioned directly over and generally congruent with the top of the platform 50 (FIG. 1) to a second position extending from the side of the platform 50 (FIG. 3), so that a cake 100 can be easily transferred from a surface on which the cake 100 has been assembled and iced to the slide 52. Extending from under the slide 52 and mounted on the sides of the platform 50 proximate the slide 52 by suitable hinges 46 are a pair of sides 40, 42 (FIGS. 2 and 4). After a cake 100 has been transferred to the slide 52, and the slide 52 has been slid back to the first position over the platform 50, the sides 40, 42 can be rotated, such as by suitable handles 44, upwards to extend above the platform 50 to help secure the cake 100 on the carrier 10. The hinges can include a suitable amount of frictional resistance so that they will resist movement from the upward extending position and/or lock in place in the upward position by suitable means. A drawer 60 operable with a handle 62 is provided in the platform for suitable culinary utensils and the like. At the bottom of each corresponding pole 30 a lockable, removable castor 34 is mounted, so that the carrier 10 can be easily rolled over a surface during transportation of a cake 100 and locked in place during transfer of the cake 100. Mounted on each pole 30 between the bottom of the base 20 and the castors 34 is a shock absorber 32 to cushion the effect of traversing uneven surfaces with the carrier 10 when transporting a cake 100. In addition, extension poles 36 (FIG. 4) can be affixed to the upper ends of the poles 30 as desired as in the case of very high cakes or the like. A cover 90, preferably formed from a mesh like material can be wrapped around the poles 30 to further protect the cake 100 during transport. In use the carrier 10 is first positioned adjacent a surface on which a cake 100 has been assembled and frosted, such as a kitchen table, and the castors 34 are locked in place. The height of the platform 50 is then adjusted so that the slide 52 matches the height of the surface. The slide 52 is then extended in the direction B of the surface, and the cake 100 is transferred onto the slide 52. Typically, the cake 100 is assembled on a piece of cardboard or like material, and the slide 52 can be slid under the cardboard while slightly elevating the cardboard and cake 100. The slide 52 is then slid back to the first position over the platform 50. The platform 50 is preferably provided with a non-slip surface such as a rubber mat 54 (FIG. 6). The platform 50 is then lowered to reduce the center of gravity and increase the stability of the carrier 10 and cake 100. A mesh-like cover 90 is then draped over the poles to further protect the cake 100 during transport. The castors 36 are unlocked and the carrier 10 and cake 100 are transported to the wedding reception or other destination, and the process is reversed to deliver the cake 100.

Various modifications can be made in the details of the various embodiments of the apparatus of the present invention, all within the scope and spirit of the invention as defined by the appended claims.

The invention claimed is:
1. A cake carrier comprising:
   a height adjustable platform for receiving a cake;
   a plurality of telescoping poles for supporting the height adjustable platform, the height of the poles being adjustable, the poles being provided with detents and holes so that the poles can be locked in place at predetermined extensions;

a cover extending between the poles to protect the cake being transported, the cover being formed from a mesh material and wrapped around the poles to protect the cake during transport;

a hydraulic lift for adjusting the height of the platform;

a tray covering the height adjustable platform, the tray being extendible from a first position covering the platform to a second position extending from the side of the platform, the tray being provided with a non-slip surface;

sides extending from the platform, the sides being adjustable from a first position extending downward to a second position extending upward, the sides being lockable in the second position; and a plurality of lockable castors.

2. A cake carrier according to claim 1 further including an integral drawer for storage of utensils.

3. A cake carrier according to claim 1 further including a base extending between the poles and supporting the means for adjusting the height of the platform.

4. A cake carrier according to claim 1 wherein a castor is affixed to each pole.

5. A cake carrier according to claim 1 further including at least one extension pole mounted on top of a corresponding pole.

6. A cake carrier according to claim 1 further including shock absorbers for cushioning the effect of encountering irregular surfaces during transport of a cake.

7. A cake carrier according to claim 6 wherein the shock absorbers are mounted below the base on the poles.

8. A method of transporting a cake, the method comprising:

a) providing a cake to be transported, b) providing a cake carrier, the cake carrier comprising:

a height adjustable platform for receiving the cake;

a plurality of telescoping poles for supporting the height adjustable platform, the height of the poles being adjustable, the poles being provided with detents and holes so that the poles can be locked in place at predetermined extensions;

a cover extending between the poles to protect the cake being transported, the cover being formed from a mesh material and wrapped around the poles to protect the cake during transport;

a hydraulic lift for adjusting the height of the platform;

a tray covering the height adjustable platform, the tray being extendible from a first position covering the platform to a second position extending from the side of the platform;

sides extending from the platform, the sides being adjustable from a first position extending downward to a second position extending upward, the sides being lockable in the second position; and a plurality of lockable castors;

c) positioning the cake carrier near the cake;

d) locking the castors;

e) adjusting the height adjustable platform;

f) extending the tray from the first position to the second position;

g) transferring the cake to the tray;

h) moving the tray from the second position to the first position;

i) adjusting the sides from the first position to the second position;

j) providing the cover around the poles to protect the cake;

k) unlocking the castors;

l) transporting the cake.

\* \* \* \* \*